United States Patent
Jia et al.

(10) Patent No.: US 9,912,414 B2
(45) Date of Patent: Mar. 6, 2018

(54) ITERATIVE POST-EQUALIZATION FOR COHERENT OPTICAL RECEIVERS

(71) Applicant: ZTE Corporation, Shenzhen (CN)

(72) Inventors: Zhensheng Jia, Morganville, NJ (US); Yi Cai, Jackson, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/941,472

(22) Filed: Nov. 13, 2015

(65) Prior Publication Data

US 2016/0142154 A1    May 19, 2016

Related U.S. Application Data

(60) Provisional application No. 62/079,751, filed on Nov. 14, 2014.

(51) Int. Cl.

| H04B 10/61 | (2013.01) |
|---|---|
| H04L 25/03 | (2006.01) |
| H04L 1/00 | (2006.01) |
| H04L 7/04 | (2006.01) |

(52) U.S. Cl.
CPC ....... *H04B 10/6165* (2013.01); *H04L 1/0047* (2013.01); *H04L 1/0054* (2013.01); *H04L 7/048* (2013.01); *H04L 25/03019* (2013.01); *H04L 25/03267* (2013.01); *H04L 25/03273* (2013.01); *H04L 2025/03636* (2013.01)

(58) Field of Classification Search
USPC .................................................. 398/27, 208
See application file for complete search history.

(56) References Cited

U.S. PATENT DOCUMENTS

| 9,391,731 B2 | 7/2016 | Jia et al. | |
|---|---|---|---|
| 2001/0004390 A1* | 6/2001 | Pukkila | H04L 25/0212 375/340 |
| 2003/0156603 A1* | 8/2003 | Rakib | H03M 13/256 370/485 |

(Continued)

FOREIGN PATENT DOCUMENTS

EP    2 782 282 A2    9/2014

OTHER PUBLICATIONS

Cai, J.-X., et al., "Transmission over 9,100 km with a Capacity of 49.3 Tb/s Using Variable Spectral Efficiency 16 QAM Based Coded Modulation," Optical Fiber Communications Conference and Exhibition (OFC), San Francisco, CA, USA, 3 pages, Mar. 2014.

(Continued)

*Primary Examiner* — David Payne
*Assistant Examiner* — Omar S Ismail
(74) *Attorney, Agent, or Firm* — Perkins Coie LLP

(57) ABSTRACT

A post-equalization technique for recovering data bits from a coherent modulation optical signal is implemented in the digital domain by iteratively performing a decision-directed least mean square channel equalization step, a digital post filter step and a maximum likelihood sequence estimation step so that the symbol decisions of the previous iteration are fed to the decision directed least mean square channel equalization step to successively improve the symbol decisions. In an experimental setup, the iterative technique demonstrated performance improvement mitigating the bandwidth limitation as compared to a corresponding non-iterative technique.

28 Claims, 9 Drawing Sheets

(56) References Cited

U.S. PATENT DOCUMENTS

| | | | | |
|---|---|---|---|---|
| 2010/0021179 | A1* | 1/2010 | Kikuchi | H04B 10/61 398/183 |
| 2011/0150503 | A1* | 6/2011 | Winzer | H04B 10/60 398/202 |
| 2012/0250785 | A1* | 10/2012 | Vidal | H03M 13/251 375/295 |
| 2012/0251112 | A1* | 10/2012 | Sadot | H04B 10/613 398/65 |
| 2013/0170842 | A1* | 7/2013 | Koike-Akino | H04L 25/03171 398/208 |
| 2013/0223843 | A1 | 8/2013 | Jia et al. | |
| 2013/0308960 | A1 | 11/2013 | Horikoshi et al. | |
| 2014/0199076 | A1 | 7/2014 | Yu et al. | |

OTHER PUBLICATIONS

Carvalho, L.H.H., et al., "WDM Transmission of 3x1.12-Tb/s PDM-16QAM Superchannels with 6.5-b/s/Hz in a 162.5-GHz Flexible-Grid using only Optical Spectral Shaping," Optical Fiber Communication Conference, OSA Technical Digest (online) (Optical Society of America, 2014), San Francisco, CA, USA, Paper M3C.3 (3 pages), Mar. 2014.

European Search Report dated Mar. 2, 2016 for European Patent Application No. 15275235.8, filed on Nov. 13, 2015 (12 pages).

Examination Report dated Mar. 10, 2017 for European Patent Application No. 15275235.8, filed on Nov. 13, 2015 (8 pages).

Gringeri, S., et al., "Technical Considerations for Supporting Data Rates Beyond 100 Gb/s," IEEE Communications Magazine, 50(2):S21-S30, Feb. 2012.

Jia, Z., et al., "Experimental demonstration of iterative post-equalization algorithm for 37.5-Gbaud PM-16QAM quad-carrier Terabit superchannel," Optics Express, 23(3):2157-2162, Feb. 2015.

Jia, Z., et al., "Performance Comparison of Spectrum-Narrowing Equalizations with Maximum Likelihood Sequence Estimation and Soft-Decision Output," Optics Express, 22(5):6047-6059, Mar. 2014.

Ke, J.H., et al., "400 Gbit/s single-carrier and 1 Tbit/s three-carrier superchannel signals using dual polarization 16-QAM with look-up table correction and optical pulse shaping," Optics Express, 22(1):71-83, Jan. 2014.

Li, J., et al., "Building up low-complexity spectrally-efficient Terabit superchannels by receiver-side duobinary shaping," Optics Express, 20(9):10271-10282, Apr. 2012.

Ma, Y., et al., 1-Tb/s Single-Channel Coherent Optical OFDM Transmission Over 600-km SSMF Fiber with Subwavelength Bandwidth Access, Optics Express, 17(11):9421-9427, May 2009.

Raybon, G., et al., "Single-Carrier and Dual-Carrier 400-Gb/s and 1.0-Tb/s Transmission Systems," Optical Fiber Communication Conference, OSA Technical Digest (online) (Optical Society of America, 2014), San Francisco, CA, USA, Paper Th4F.1 (3 pages), Mar. 2014.

Renaudier, J., et al., "1-Tb/s PDM-32QAM Superchannel Transmission at 6.7-b/s/Hz over SSMF and 150-GHz-Grid ROADMs," European Conference on Optical Communication (ECOC), Cannes, France, Paper Tu.3.3.4 (3 pages), Sep. 2014.

Sand, A., et al., "69.1-Tb/s (432 x 171-Gb/s) C- and Extended L-Band Transmission over 240 km Using PDM-16-QAM Modulation and Digital Coherent Detection," Conference on Optical Fiber Communication (OFC), collocated National Fiber Optic Engineers Conference (OFC/NFOEC), San Diego, CA, USA, Paper PDPB7 (3 pages), Mar. 2010.

Savory, S.J., "Digital Coherent Optical Receivers: Algorithms and Subsystems," IEEE Journal of Selected Topics in Duantum Electronics, 16(5):1164-1179, Sep./Oct. 2010.

Tipsuwannakul, E., et al. "Transmission of 3x224 Gbit/s DP-16QAM Signals with (up to) 72 bits/Hz Spectral Efficiency in SMF-EDFA Links," Optical Fiber Communication Conference and Exposition and the National Fiber Optic Engineers Conference (OFC/NFOEC), Los Angeles, CA, USA, Paper OW4C.6 (3 pages), Mar. 2012.

Xiang, M., et al., "Nyquist WDM superchannel using offset-16QAM and receiver-side digital spectral shaping," Optics Express, 22(14):17448-17457, Jul. 2014.

Xie, C., et al., "Transmission Performance of 256-Gb/s PDM-16QAM With Different Amplification Schemes and Channel Spacings," Journal of Lightwave Technology, 32(13):2324-2331, Jul. 2014.

Yu, J., et al., "Transmission of 200 G PDM-CSRZ-OPSK and PDM-16 QAM With a SE of 4 b/s/Hz," Journal of Lightwave Technology, 31(4):515-522, Feb. 2013.

Zhou, X. et al."400G WDM Transmission on the 50 GHz Grid for Future Optical Networks," Journal of Lightwave Technology, 30(24):3779-3792, Dec. 2012.

\* cited by examiner

ITERATIVE POST-EQUALIZATION FOR COHERENT OPTICAL RECEIVERS

CROSS REFERENCE TO RELATED APPLICATIONS

This patent document claims the benefit of U.S. Provisional Patent Application No. 62/079,751, filed on Nov. 14, 2014. The entire content of the before-mentioned patent application is incorporated by reference as part of the disclosure of this document.

TECHNICAL FIELD

This patent document relates to digital communication, and in one aspect, to receiver-side processing of optical transmission signals.

BACKGROUND

There is an ever-growing demand for data communication in application areas such as wireless communication, fiber optic communication, and so on. The bandwidth demand on core networks is especially higher because not only user devices such as smartphones and computers are using more and more bandwidth due to multimedia applications, but also the total number of devices for which data is carried over core networks is increasing.

SUMMARY

This patent document describes technologies for processing received optical signals to recover information modulated on the signals.

In one example aspect, a method of recovering information bits from a modulated optical signal in which information bits are modulated using a coherent modulation technique is disclosed. The method includes receiving the modulated signal over an optical transmission medium, generating a stream of digital samples by performing analog-to-digital conversion of the received modulated signal, processing the stream of digital samples through a first decoding stage in which carrier frequency and phase recovery is performed, performing, after the first decoding stage, post-equalization on the stream of digital samples; wherein the performing post-equalization includes iteratively performing: a channel equalization on the stream of digital samples, a digital filtering operation on output of the channel equalization using a digital post filter, and a symbol estimation operation on output of the digital post filter until an iteration termination criterion is satisfied. The output of the symbol estimation operation is fed back into the channel equalization operation. The method further includes recovering, after termination of iterations, the information bits from the output of the symbol estimation process.

In another example aspect, an optical communication receiver apparatus for recovering information bits from a modulated optical signal in which information bits are modulated using a coherent modulation technique is disclosed. The apparatus includes an optical front end that receives the modulated signal over an optical transmission medium, an analog to digital converter that generates a stream of digital samples by performing analog-to-digital conversion of the received modulated signal, a memory that stores executable instructions, and a digital signal processor that reads the executable instructions from the memory and implements a method, including: processing the stream of digital samples through a first decoding stage in which carrier frequency and phase recovery is performed, performing, after the first decoding stage, post-equalization on the stream of digital samples; wherein the performing post-equalization includes iteratively performing, a channel equalization on the stream of digital samples, a digital filtering operation on output of the channel equalization using a digital post filter, and a symbol estimation operation on output of the digital post filter until an iteration termination criterion is satisfied, and recovering, after termination of iterations, the information bits from the output of the symbol estimation process. An output of the symbol estimation operation is fed back into the channel equalization operation.

In yet another aspect, an optical communication system is disclosed. The system includes an optical signal transmitter that produces an optical signal comprising information bits modulated using a coherent modulation technique and an optical signal receiver that recovers the information bits from the modulated optical signal. The recovery is accomplished by receiving a modulated signal over an optical transmission medium, generating a stream of digital samples by performing analog-to-digital conversion of the received modulated signal, processing the stream of digital samples through a first decoding stage in which carrier recovery and phase recovery is performed, performing, after the first decoding stage, post-equalization on the stream of digital samples; wherein the performing post-equalization includes iteratively performing, a channel equalization on the stream of digital samples, a digital filtering operation on output of the channel equalization using a digital post filter, and a symbol estimation operation on output of the digital post filter until an iteration termination criterion is satisfied, and recovering, after termination of iterations, the information bits from the output of the symbol estimation process.

Particular implementation of the subject matter described in this patent application can mitigate symbol degradation from a transmitted signal, resulting in more accurate reception of modulated data. Such implementation can also increase the signal to noise ratio margin of transmitted data, thereby possibly increasing the amount of data transmitted on a per hertz per second basis, mitigating the channel bandwidth limitation.

The details of multiple implementations are set forth in the accompanying drawings and description below.

DETAILED DESCRIPTION

With the growth in demand on bandwidth carried over communication networks, network operators, service providers, and equipment vendors have been looking for ways to increase network throughput using the existing network infrastructure. At the core of a communication network, data is often carried over optical transmission medium. Advances in optical transmission and reception techniques could therefore benefit not just the core network, but the total end-to-end user experience in today's communication networks such as mobile (cellular), cable modem, and other networks.

Figure 1:
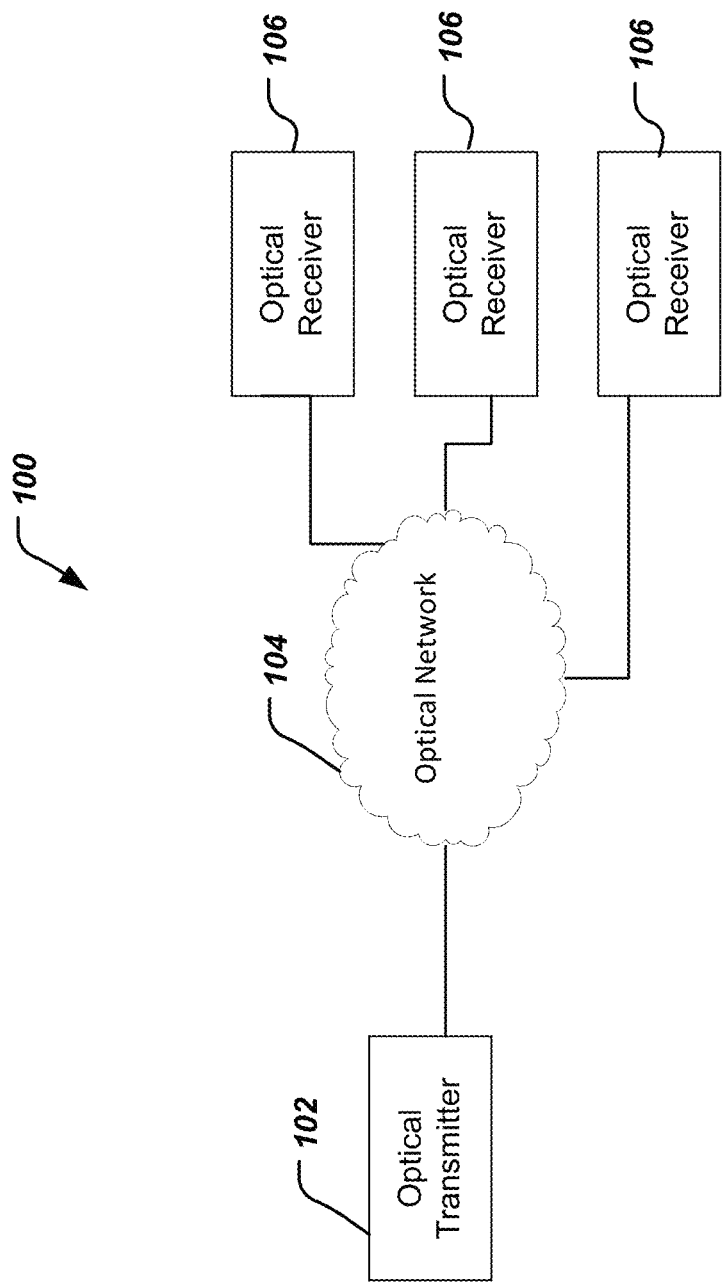
FIG. 1 shows an example of an optical communication system.

FIG. 1 depicts an optical communication system 100 in which the presently disclosed technology can be practiced. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, reconfigurable optical add-drop multiplexing (ROADM), etc., which are not shown in FIG. 1 for clarity.

A typical coherent optical receiver commonly adopts a least-mean-square (LMS) algorithm such as constant modulus algorithm (CMA) or decision-directive LMS algorithm for its equalizer implementation. A butterfly equalizer structure is also typically used for such implementation. These linear equalizers offer good performance on the channels with well-behaved spectral characteristics to compensate the major linear transmission impairments. When the signal passes through a bandwidth-limited channel, the signal typically undergoes inter-symbol-interference (ISI) impairment. The full-response equalizer is expected to exhibit a frequency response roughly inverse to the channel frequency response, which means the attenuation of certain spectral components will translate to the gain of the linear equalizer on the same spectral components. However, in-band noise on the same spectral component is also amplified with the signal. As a result of that, the noise is enhanced and the signal to noise ratio (SNR) decreases.

In case of such bandwidth-limited transmissions, digital signal processing (DSP) can utilize finite-impulse-response (FIR) digital post filters and multi-symbol detection algorithms to suppress enhanced noise and to compensate the ISI distortions. Besides the typical DSP flow, a digital post filter (DPF) is added after the carrier frequency and phase recovery. The function of the DPF is to suppress the enhanced noise by other equalization process before it, hence leading to a significant signal-to-noise ratio improvement.

Optical reception techniques based on coherent detection and DSP have established their indispensable roles in ultra-high speed optical transport to improve the receiver sensitivity and achieve superior channel equalization of signal impairments. Increasing spectral efficiency (SE) and the flexible configuration of optical switching are the major facilitators in developing high-speed optical transport networks. To enhance SE and the data rate per channel, and thus the total channel capacity, pulse shaping, or narrowband prefiltering and higher symbol rate, has been demonstrated to be an effective way by reaching super-Nyquist bandwidth. In these implementations the channel spacing is typically set to be equal or even smaller than the baud rate (Nyquist bandwidth).

Similarly, a reconfigurable optical add-drop multiplexing (ROADM) can narrow the optical signal bandwidth due to spectral truncation after passing multiple wavelength-selective switch (WSS) based optical nodes.

In any of these cases, the ISI impairment is compensated to achieve acceptable performance. Schemes using DPF and the subsequent multi-symbol detection algorithms such as maximum likelihood sequence estimation (MLSE) or Bahl-Cocke-jelinek-Raviv (BCJR) algorithms have demonstrated effective noise suppression and equalization of ISI impairment. These schemes, however, lack the adaptive capability for the maximum gain that can be obtained in many different operation scenarios.

The present document discloses techniques, among others, for receiving modulated optical signals in a coherent optical receiver employing both digital post filter (DPF) and ISI equalizer such as a maximum likelihood sequence estimation (MLSE) or Bahl-Cocke-Jelinek-Raviv (BCJR) algorithms. Some disclosed techniques are directed to dynamically track the bandwidth utilization and adaptively adjust the impulse response of the DPF and the corresponding structure of ISI equalizer in different spectrum-narrowing operation scenarios.

A commonly applied FIR filter has a simple structure, such as only two or three taps with certain value tap coefficient, to suppress the enhanced noise with the followed corresponding MLSE or BCJR for multi-symbol detection algorithms. In practical transmission systems, however, the input signal of this digital post filter and multi-symbol detection scheme may have different degree of ISI impairment in different operation situations and the ISI impairment may also change for different channel conditions such as the change of number of ROADM nodes after protection and restoration action. Hence, to fully utilize the capability provided by this scheme, it is important for the DPF and the corresponding ISI equalizer to have accurate prior knowledge about the ISI impairment condition and the matched filter function for the optimal noise suppression. Since channel bandwidth during actual operations may dynamically change, an effective technique should dynamically track or estimate bandwidth utilization to achieve an optimal SNR performance.

An effective technique should also adaptively adjust the impulse response in time domain (or equivalently the frequency response in frequency domain) of the DPF and the corresponding structure of ISI equalizer in different spectrum-narrowing operation scenarios. The adjustment of DPF provides, among other things, a matched filter function for optimization of noise suppression and the subsequent ISI equalizer realizes optimal detection towards the filter introduced symbol correlation to increase the system margin for the optical signal to noise ratio (OSNR). In a coherent optical receiver employing both DPF and an ISI equalizer, the ISI equalizer may change values of equalizer parameters based on the impulse response of the digital post filter accordingly. When the impulse response of DPF approaches the matched filter of the whole channel link, the SNR reaches its optimal for the severe ISI impairment in the case of spectrum-narrowing channel.

In one advantageous aspect, the techniques disclosed in the present document can achieve the maximal benefit in different spectrum-narrowing operation scenarios, by adaptively adjusting an FIR digital post filter using a subsequent multi-symbol detection scheme to optimize the matched filter function to improve the overall system performance.

In another advantageous aspect, some embodiments can adaptively optimize the impulse or frequency response of the digital post filter and the corresponding ISI equalizer based on different bandwidth limitation level of the transmission link. In various implementations, an optical receiving method can take either soft or hard values output from the ISI equalizer module, evaluate the output signal performance of the equalized effect, and then adaptively provide the adjustment information of the impulse or frequency response of the digital filter and the change of ISI equalizer to the corresponding module for optimization of equalization performance. The module continues to get feedback from the equalized signals in an iterative fashion to further improve the accuracy of the adjusted filter shape and the following ISI equalizer. The performance evaluation can be based on the calculation of the error vector magnitude (EVM), standard deviation or the number of statistical sample within certain region of the soft values, or bit error rate (BER) of the hard values from the output of ISI equalizer. The methods described here may be applied in optical communication system with spectral narrowing impairment and other systems that use digital post filter and ISI equalizer schemes. The disclosed techniques are also applicable to other communication networks, e.g., coaxial, wireless or phone line networks, in which transmitted signals are low pass filtered during transmission, thereby introducing ISI.

Figure 2:
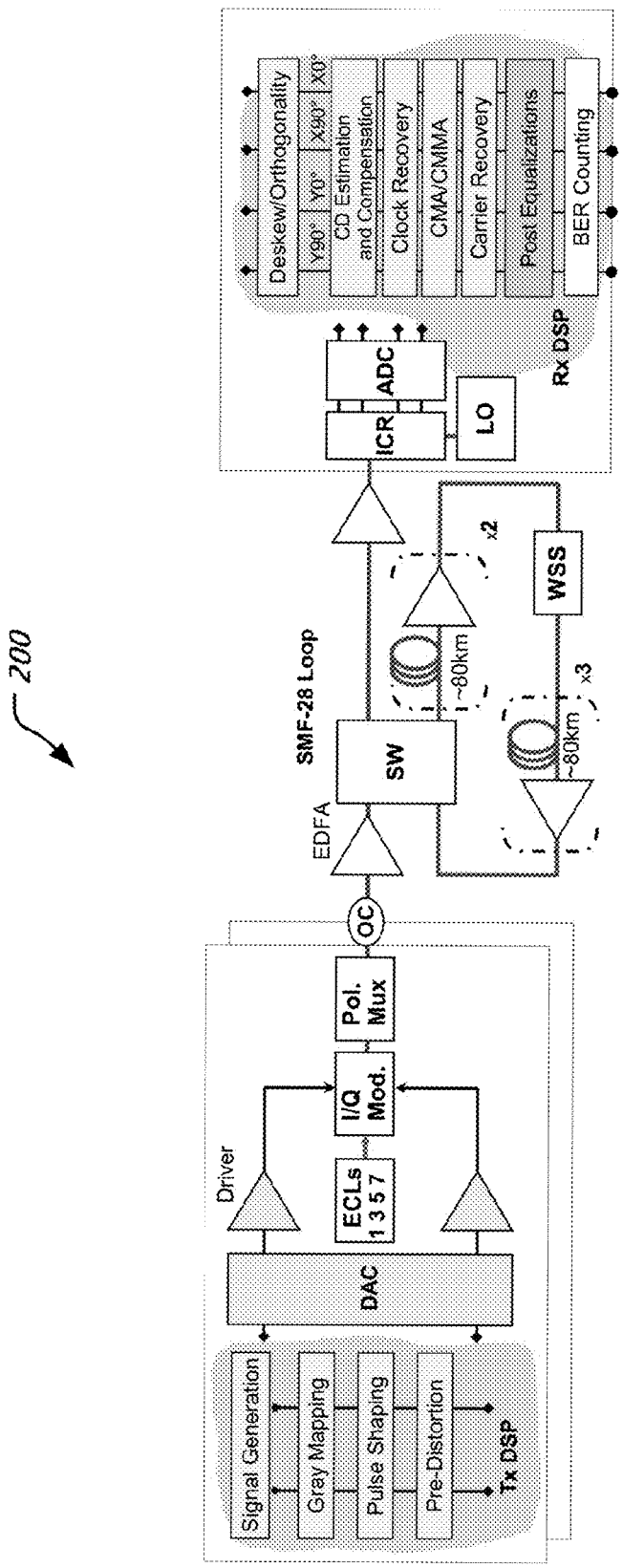
FIG. 2 shows an example of a coherent optical communication system.

FIG. 2 shows an example of a coherent optical communication system 200 that incorporates the method disclosed in the present document. The system comprises two super-channels. Eight tunable external cavity lasers (ECLs) are divided into odd and even channels and then modulated by two independent I/Q modulators followed by polarization division multiplexers. At the receiver side, the received samples are processed by DSP, including compensation of frontend distortion, estimation and compensation of chromatic dispersion (CD), followed by time-domain based clock recovery. Then polarization de-multiplexing is realized using a butterfly equalizer based on constant-modulus algorithm (CMA) and cascaded multi-modulus algorithm (CMMA). Carrier frequency recovery and phase recovery are then performed before the signals are sent into post-equalization and error counting.

Figure 3:
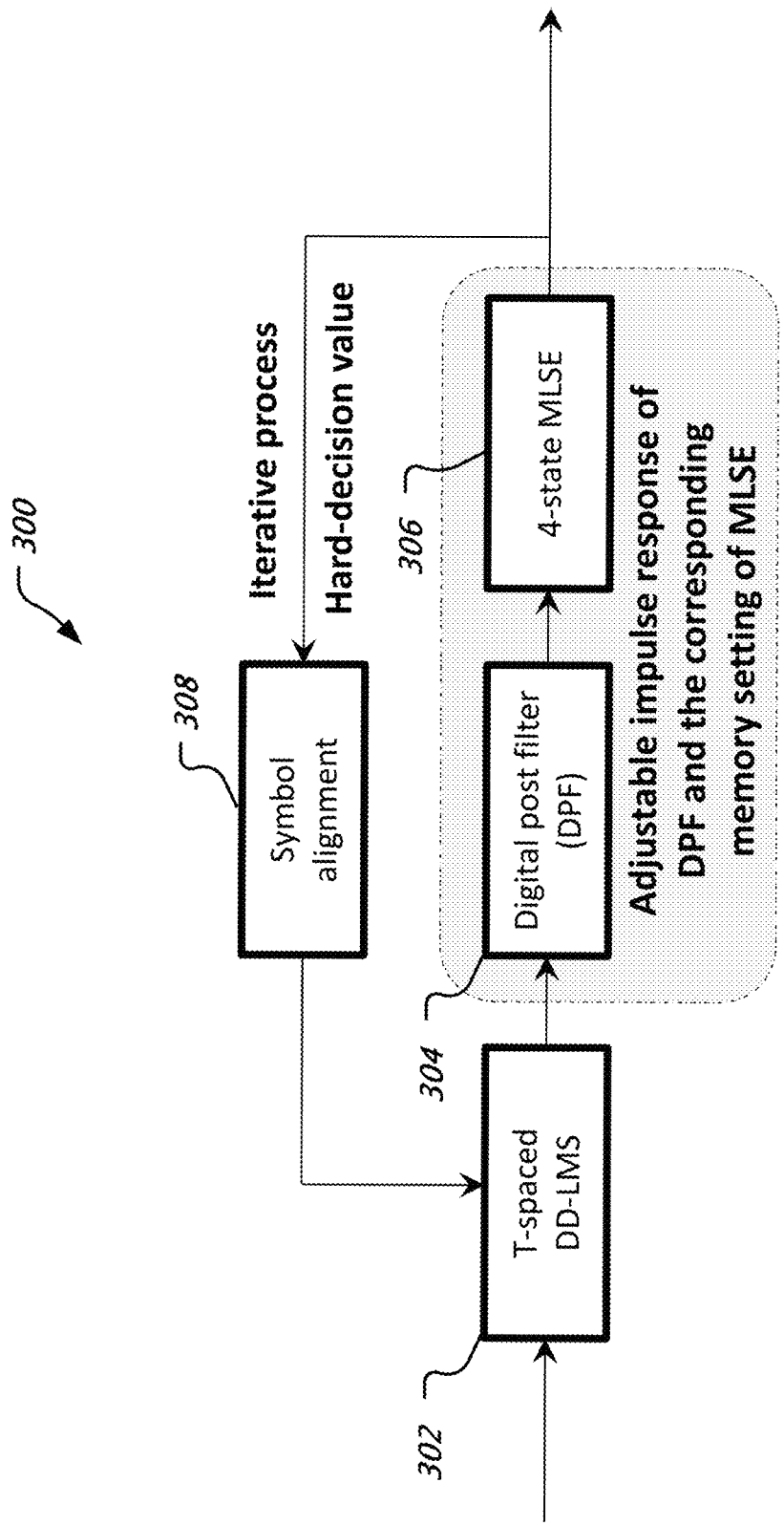
FIG. 3 is an example of a post-equalization subsystem in a digital communication receiver.

FIG. 3 is an example of a post-equalization subsystem 300 in a digital communication receiver. The output of a T-spaced DD-LMS module 302 is fed into a digital post filter (DPF) 304. The output of the DPF 304 is processed through a 4-state MLSE stage 306 in which symbol decisions are made. The hard decision values output from the MLSE stage 306 are fed back to the T-spaced DD-LMS stage 302 by performing symbol alignment 308, e.g., by selecting the appropriate symbols output from the MLSE stage 306, for the DD-LMS decision input. While the use of 4-state MLSE may be suitable for a PM-16QAM system, other modulation formats can also be handled using the corresponding n-state MLSE.

Figure 4:
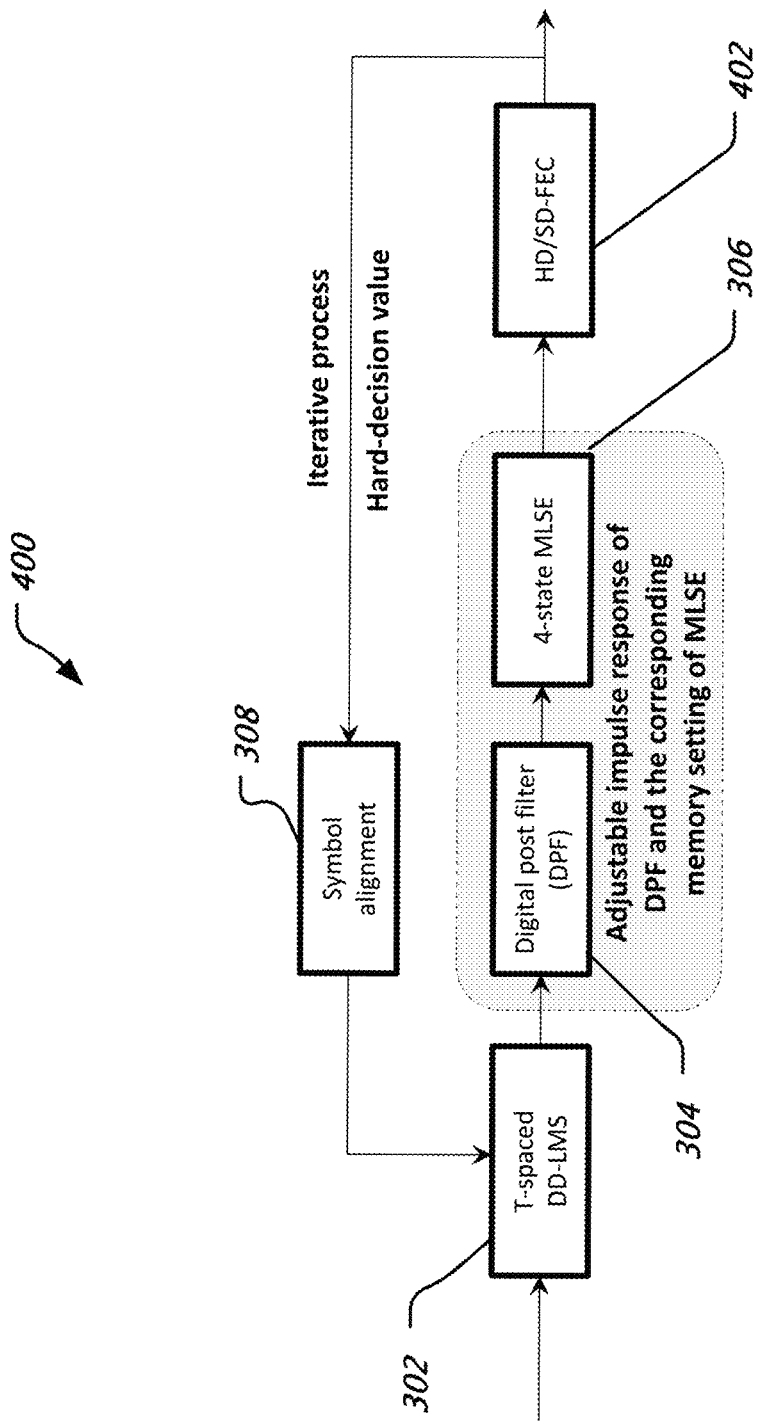
FIG. 4 is an example of a post-equalization subsystem, which includes forward error correction, in a digital communication receiver.

FIG. 4 is an example of a post-equalization subsystem 400, which includes forward error correction 402 in a digital communication receiver. Compared to FIG. 3, the output of the MLSE stage is error correction code using either a soft-decision (SD) or hard-decision (HD) forward error correction (FEC) stage before feeding back to the iterative process.

Figure 5:
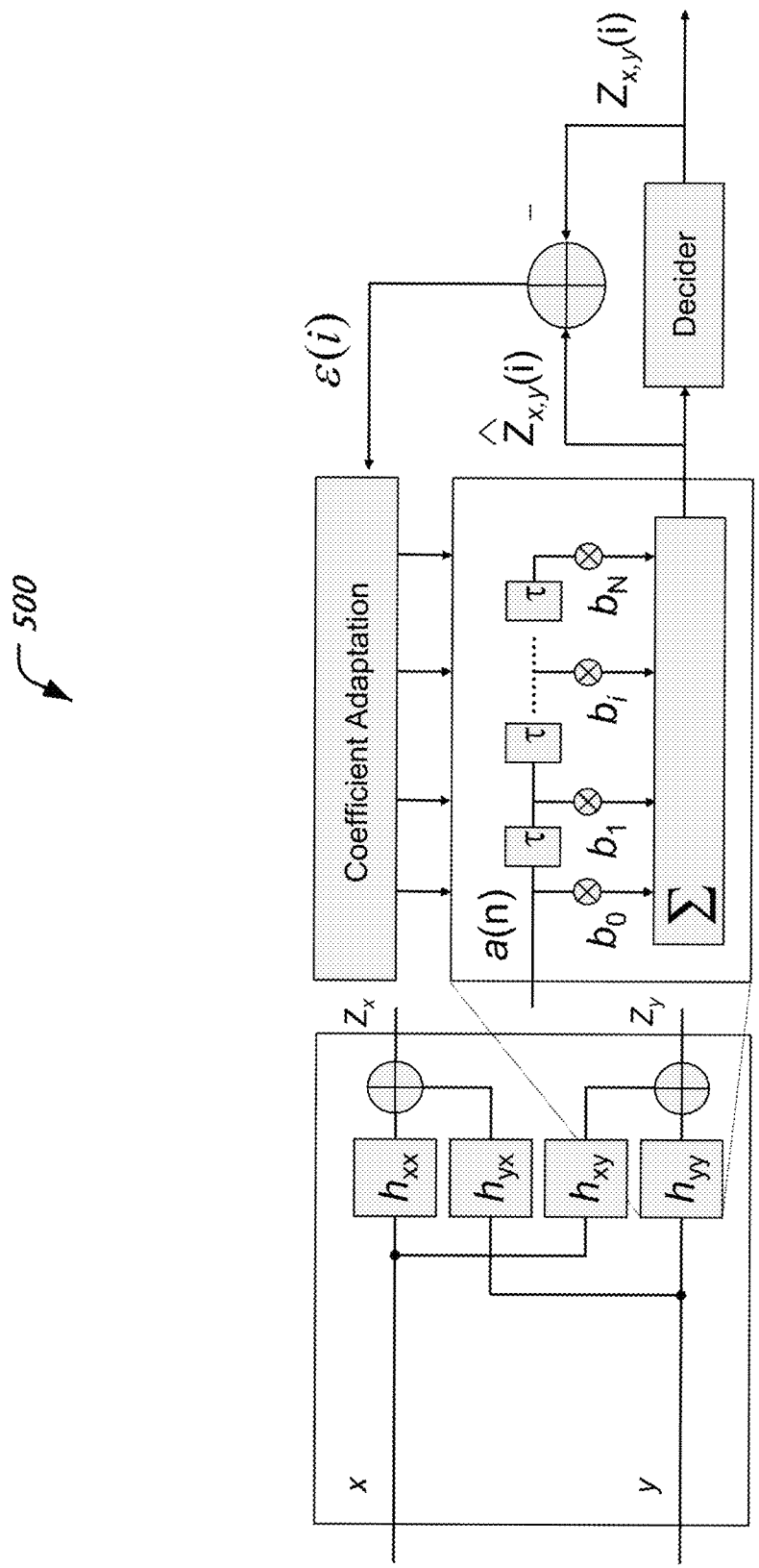
FIG. 5 shows an example of a T-spaced decision directed least mean square (DD-LMS) module.

FIG. 5 shows an example of a T-spaced decision directed least mean square (DD-LMS) module 500. In the depiction in FIG. 5, i is the symbol time index, x and y represent the two incoming orthogonal polarization signals, respectively). $\epsilon(i)$ denotes error signal. $Z_{z,y}(i)$ denotes the decision symbols for the coefficient adaptation. $Z_{x,y}(i)$ denotes the equalized symbols for the input of the subsequent DPF and MLSE.

After the symbol alignment, the output of MLSE hard value or FEC hard value is fed back as the new value of $Z_{x,y}(i)$ for iterative process of DD-LMS. The positive feedback in the iterative process keeps improving performance as the DPF and MLSE help correct more errors.

Figure 6:
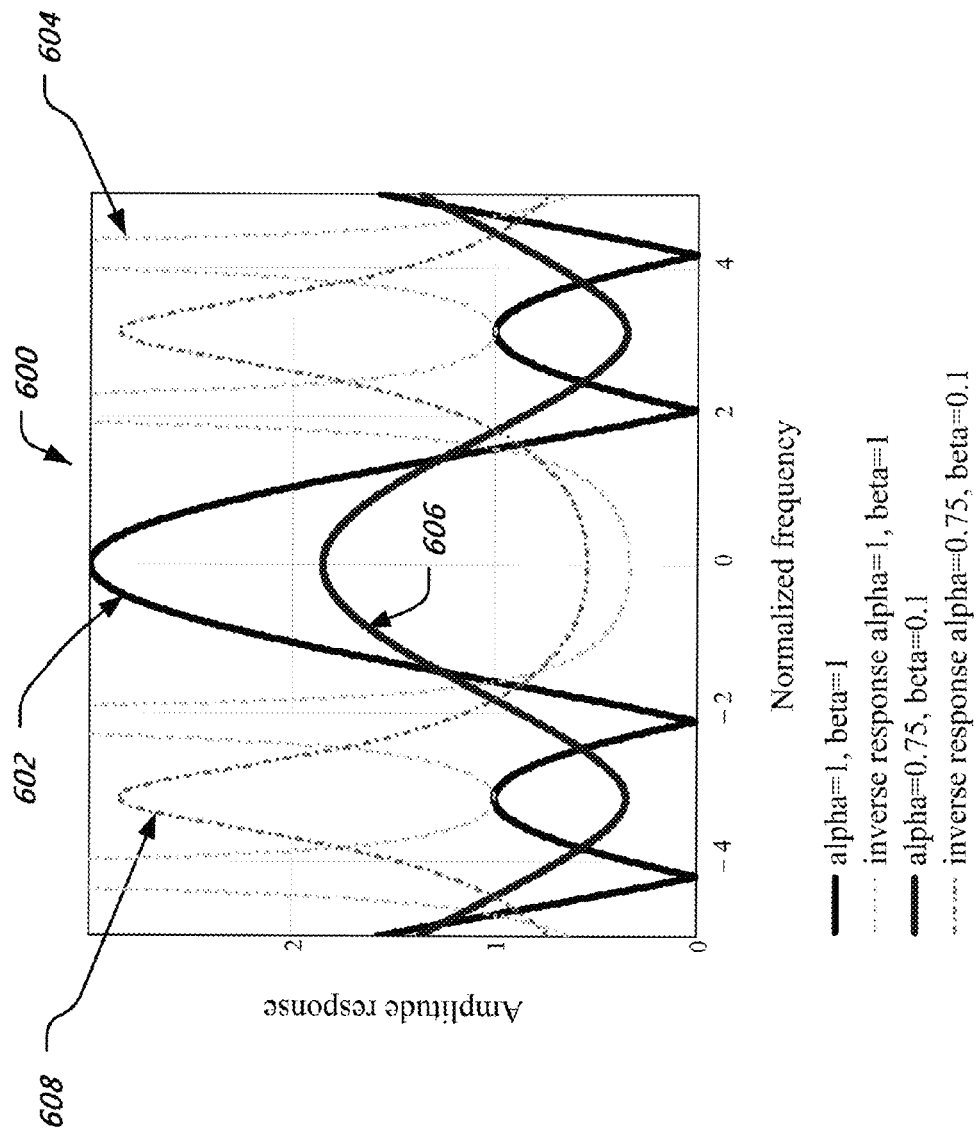
FIG. 6 shows an example of amplitude response of a digital post filter (DPF).

FIG. 6 shows examples of amplitude response 600 of a DPF. As an example, the DPF can be simply implemented by two-tap or three-tap FIR structure with the impulse response in z-transform given by (1) and (2) respectively.

$$H\_2tap(z)=1+\alpha \cdot z^{\wedge}(-1) \tag{1}$$

$$H\_3tap(z)=1+\alpha \cdot z^{\wedge}(-1)+\beta \cdot z^{\wedge}(-2) \tag{2}$$

where $\alpha$ and $\beta$ represent the filter adjustable tap coefficients. The graphs 602, 604, 606 and 608 represent filter responses for the various values of $\alpha$ and $\beta$, as indicated in FIG. 6. The optimization this digital filter provides by adjustment of $\alpha$, or $\alpha$ and $\beta$, is to approach the matched filter function of the whole link for SNR improvement. To achieve the maximal benefit in different spectrum-narrowing operation scenarios, an adaptively adjustable DPF and the subsequent multi-symbol detection scheme can be used to optimize the matched filter function to improve the overall system performance.

Figure 7:
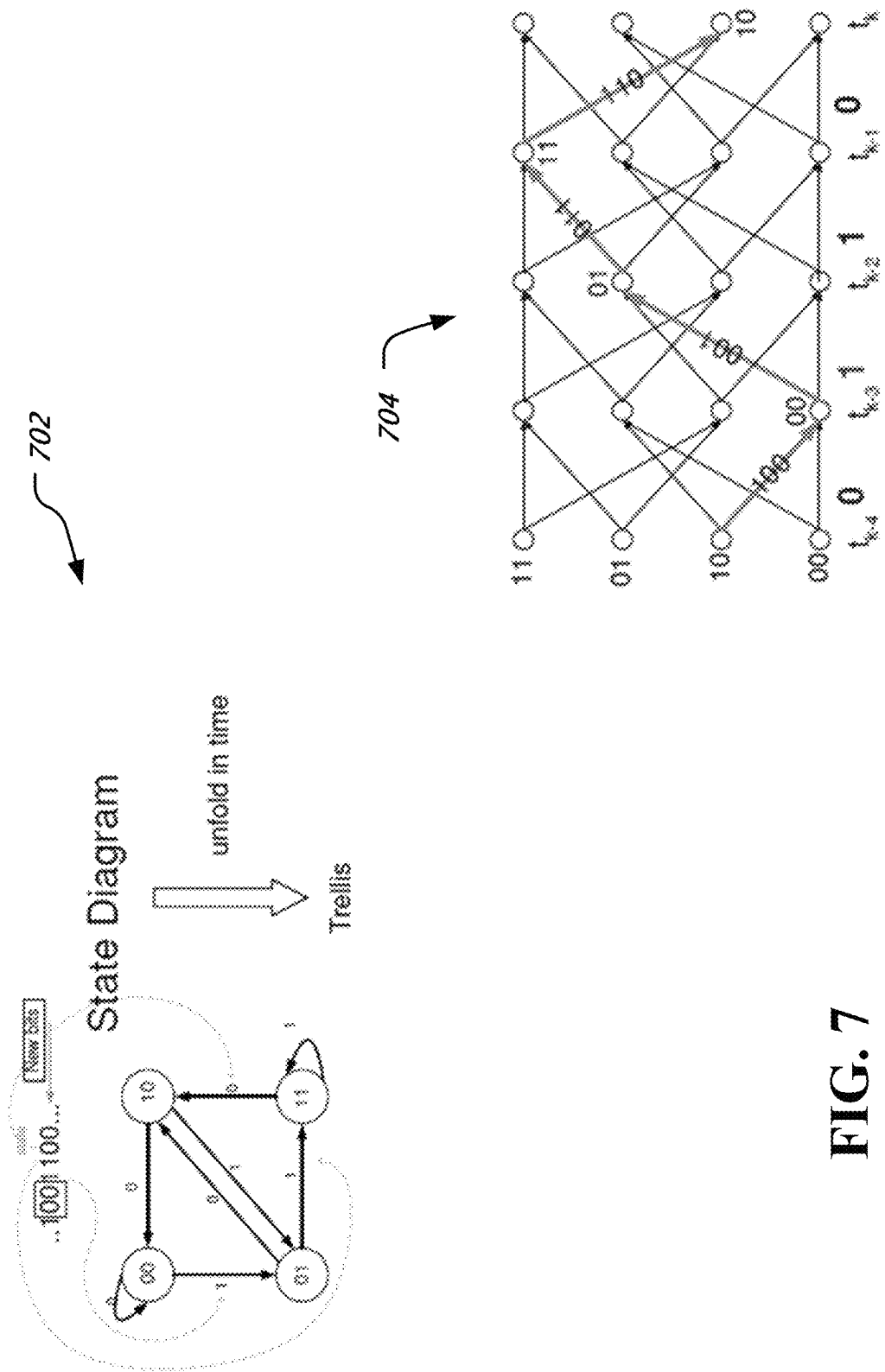
FIG. 7 shows an example state diagram and an example trellis structure for maximum likelihood sequence estimation.

FIG. 7 shows an example state diagram 702 and an example trellis structure 704 for maximum likelihood sequence estimation. A physical channel state can be viewed as the set of samples that determine noise-free channel output. A physical channel state is then associated with trellis state transitions. An MLSE may look for all paths through the trellis and select a "best" path. The algorithm may work from left to right and at each state; only the best of the incoming paths (the survivor) is stored.

Figure 8:
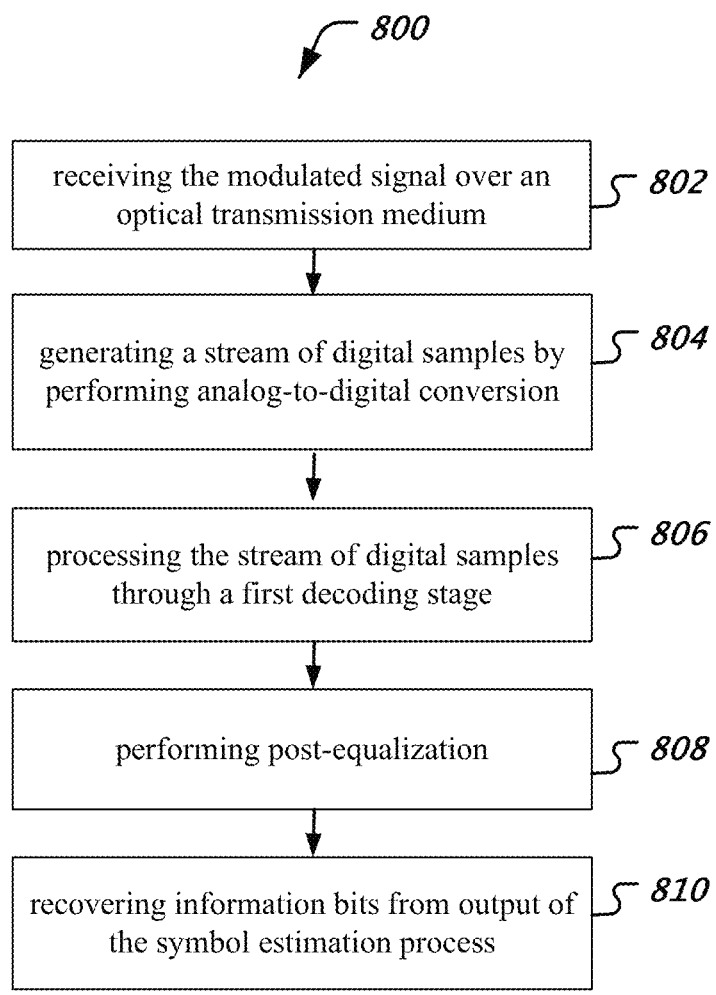
FIG. 8 is a flowchart example of a method of optical communication.

FIG. 8 shows an example of a method 800 of recovering information bits from a modulated optical signal in which information bits are modulated using a coherent modulation technique.

At 802, the method 800 includes receiving the modulated signal over an optical transmission medium.

At 804, the method 800 includes generating a stream of digital samples by performing analog-to-digital conversion of the received modulated signal.

At 806, the method 800 includes processing the stream of digital samples through a first decoding stage in which carrier recovery and phase recovery is performed.

At 808, the method 800 includes performing, after the first decoding stage, post-equalization on the stream of digital samples. The performing post-equalization includes iteratively performing a channel equalization on the stream of digital samples, a digital filtering operation on output of the channel equalization using a digital post filter, and a symbol estimation operation on output of the digital post filter, until an iteration termination criterion is satisfied. The output of the symbol estimation operation is fed back into the channel equalization operation. The iteration termination criteria may include estimating improvement in the BER from one iteration to the next. In general, the number of iterations it may take so that there is not enough improvement in BER in the next iteration, may be a function of operational parameters such as transmission characteristic of the optical medium.

In some embodiments, channel equalization may be performed by estimating characteristics of the optical transmission medium using a DD-LMS algorithm in which coefficients of a channel equalizer are adjusted based on the output of the symbol estimation operation.

In some embodiments, the symbol estimation operation uses a MLSE criterion.

At 810, the method 800 includes recovering, after termination of iterations, the information bits from the output of the symbol estimation process.

In some embodiments, the method 800 may further include adaptively adjusting, using the estimates of the information bits, coefficients of the digital post filter.

In some embodiments, the method 800 may include performing error correction to generate the output of the symbol estimation operation.

In some embodiments, due to the filtering operation the number of output samples generated may be different from the number of input samples. The method 800 may thus include performing symbol alignment on the output of the symbol estimation process.

In some embodiments, the method 800 adopts a post-processing stage that processes received signals after carrier frequency and phase recovery to improve receiver performance. The post-processing stage includes an iterative process of using symbol decisions from a previous iteration to drive a decision-directed channel equalization at a next iteration.

Figure 9:
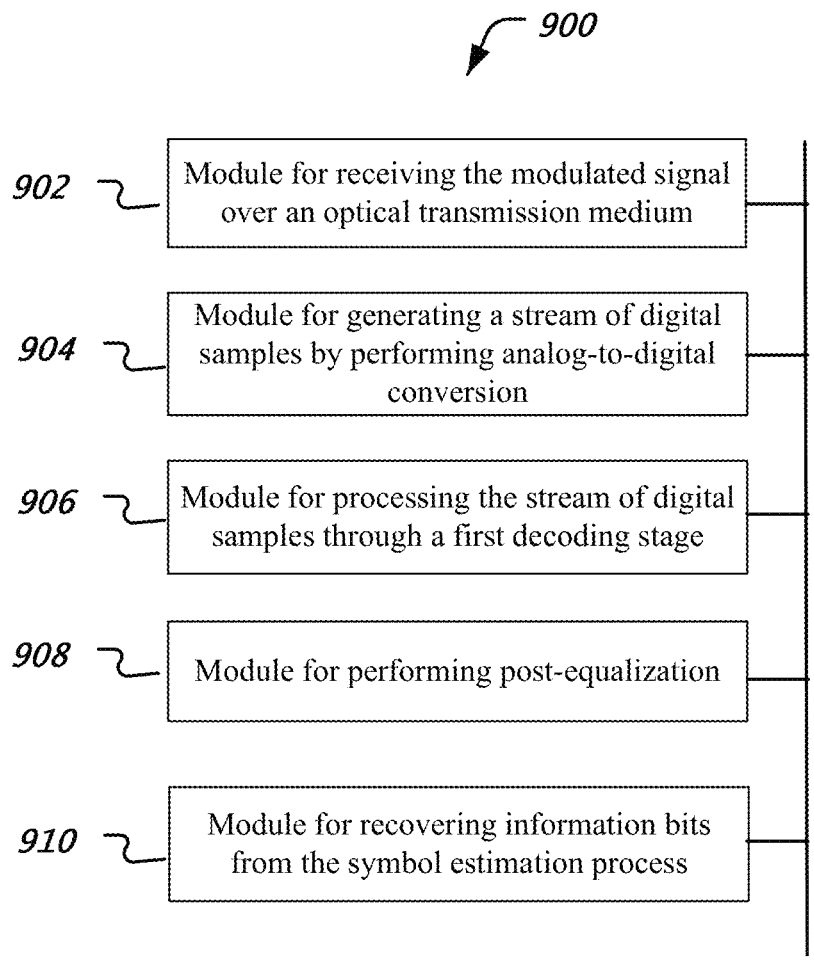
FIG. 9 is a block diagram of an example of an apparatus for optical communication.

FIG. 9 shows an example apparatus 900 for performing optical signal reception and demodulation to recover data bits included in the optical signal. The module 902 is for receiving the modulated signal over an optical transmission medium. The module 904 is for generating a stream of digital samples by performing analog-to-digital conversion. The module 906 is for processing the stream of digital samples through a first decoding stage. The module 908 is for performing post-equalization. The module 910 is for recovering information bits from the symbol estimation process.

In some embodiments, an optical communication receiver apparatus for recovering information bits from a modulated optical signal in which information bits are modulated using a coherent modulation technique may include an optical front end, an analog-to-digital converter a memory and a digital signal processor. The optical front end may include circuitry that receives the modulated signal over an optical transmission medium. The analog to digital converter may be implemented using high speed logic and may generate a stream of digital samples by performing analog-to-digital conversion of the received modulated signal. The memory that stores executable instructions. The digital signal processor that reads the executable instructions from the memory and implements a method that includes processing the stream of digital samples through a first decoding stage in which carrier recovery and phase recovery is performed, performing, after the first decoding stage, post-equalization on the stream of digital samples, wherein the performing post-equalization includes iteratively performing, a channel equalization on the stream of digital samples, a digital filtering operation on output of the channel equalization using a digital post filter, and a symbol estimation operation on output of the digital post filter; until an iteration termination criterion is satisfied, recovering, after termination of iterations, the information bits from the output of the symbol estimation process. An output of the symbol estimation operation is fed back into the channel equalization operation.

It will be appreciated that techniques that can be used to improve the performance of a digital communication receiver are disclosed. In one aspect, the disclosed techniques use iterative post-processing technique to improve the performance of the optical receiver.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of recovering information bits from a modulated optical signal, the method comprising:
   receiving the modulated optical signal over an optical transmission medium, wherein the modulated optical signal comprises information bits modulated using polarization division multiplexing;
   generating a stream of digital samples by performing analog-to-digital conversion of the received modulated signal;
   processing the stream of digital samples through a first decoding stage in which carrier frequency and phase recovery is performed to obtain a stream of recovered digital samples;
   performing, after the first decoding stage, post-equalization on the stream of recovered digital samples, wherein the performing post-equalization includes iteratively performing:
      a channel equalization on the stream of recovered digital samples;
      a digital filtering operation on output of the channel equalization using a digital post filter, wherein a response of the digital post filter is adjusted adaptively, and
      a symbol estimation operation on output of the digital post filter, wherein parameters for the symbol estimation operation are adjusted adaptively based on the response of the digital post filter;
   until an iteration termination criterion is satisfied;
   wherein an output of the symbol estimation operation is fed back into the channel equalization operation; and
   recovering, after termination of iterations, the information bits from the output of the symbol estimation process.

2. The method of claim 1, further comprising:
   adaptively adjusting, using the estimates of the information bits, coefficients of the digital post filter.

3. The method of claim 1, further comprising:
   performing error correction to generate the output of the symbol estimation operation.

4. The method of claim 1, wherein the iteration termination criterion comprises estimating improvement in a bit error ratio over a previous iteration.

5. The method of claim 1, further including:
   performing symbol alignment on the output of the symbol estimation process.

6. The method of claim 1, wherein the performing the channel equalization on the stream of samples includes estimating characteristics of the optical transmission medium using a decision directed least mean square in which coefficients of a channel equalizer are adjusted based on the output of the symbol estimation operation.

7. The method of claim 1, wherein the symbol estimation operation uses a maximum likelihood sequence estimation (MLSE) criterion.

8. An optical communication receiver apparatus for recovering information bits from a modulated optical signal, comprising:
   an optical front end that receives the modulated optical signal over an optical transmission medium, the modulated optical signal comprises information bits modulated using polarization division multiplexing;
   an analog to digital converter that generates a stream of digital samples by performing analog-to-digital conversion of the received modulated signal;
   a memory that stores executable instructions; and
   a digital signal processor that reads the executable instructions from the memory and implements a method, including:
      processing the stream of digital samples through a first decoding stage in which carrier recovery and phase recovery is performed to obtain a stream of recovered digital samples;
      performing, after the first decoding stage, post-equalization on the stream of recovered digital samples, wherein the performing post-equalization includes iteratively performing:
         a channel equalization on the stream of recovered digital samples;
         a digital filtering operation on output of the channel equalization using a digital post filter, wherein a response of the digital post filter is adjusted adaptively, and
         a symbol estimation operation on output of the digital post filter, wherein parameters for the symbol estimation operation are adjusted adaptively based on the response of the digital post filter;
      until an iteration termination criterion is satisfied;
      wherein an output of the symbol estimation operation is fed back into the channel equalization operation; and
      recovering, after termination of iterations, the information bits from the output of the symbol estimation process.

9. The optical communication receiver apparatus of claim 8, wherein the method further includes:
   adaptively adjusting, using the estimates of the information bits, coefficients of the digital post filter.

10. The optical communication receiver apparatus of claim 8, wherein the method further includes:
  performing error correction to generate the output of the symbol estimation operation.

11. The optical communication receiver apparatus of claim 8, wherein the iteration termination criterion comprises estimating improvement in a bit error ratio over a previous iteration.

12. The optical communication receiver apparatus of claim 8, wherein the method further includes:
  performing symbol alignment on the output of the symbol estimation process.

13. The optical communication receiver apparatus of claim 8, wherein the performing the channel equalization on the stream of samples includes estimating characteristics of the optical transmission medium using a decision directed least mean square in which coefficients of a channel equalizer are adjusted based on the output of the symbol estimation operation.

14. The optical communication receiver apparatus of claim 8, wherein the symbol estimation operation uses a maximum likelihood sequence estimation (MLSE) criterion.

15. An optical communication system comprising:
  an optical signal transmitter that produces an optical signal comprising information bits modulated using polarization division multiplexing; and
  an optical signal receiver that recovers the information bits from the modulated optical signal by:
  receiving the modulated signal over an optical transmission medium;
  generating a stream of digital samples by performing analog-to-digital conversion of the received modulated signal;
  processing the stream of digital samples through a first decoding stage in which carrier recovery and phase recovery is performed to obtain a stream of recovered digital samples;
  performing, after the first decoding stage, post-equalization on the stream of recovered digital samples, wherein the performing post-equalization includes iteratively performing:
    a channel equalization on the stream of recovered digital samples;
    a digital filtering operation on output of the channel equalization using a digital post filter, wherein a response of the digital post filter is adjusted adaptively, and
    a symbol estimation operation on output of the digital post filter, wherein parameters for the symbol estimation operation are adjusted adaptively based on the response of the digital post filter;
  until an iteration termination criterion is satisfied;
  wherein an output of the symbol estimation operation is fed back into the channel equalization operation; and
  recovering, after termination of iterations, the information bits from the output of the symbol estimation process.

16. The optical communication system of claim 15, wherein the receiver-implemented method further includes:
  adaptively adjusting, using the estimates of the information bits, coefficients of the digital post filter.

17. The optical communication system of claim 15, wherein the receiver-implemented method further includes:
  performing error correction to generate the output of the symbol estimation operation.

18. The optical communication system of claim 15, wherein the iteration termination criterion comprises estimating improvement in a bit error ratio over a previous iteration.

19. The optical communication system of claim 15, wherein the receiver-implemented method further includes:
  performing symbol alignment on the output of the symbol estimation process.

20. The optical communication system of claim 15, wherein the performing the channel equalization on the stream of samples includes estimating characteristics of the optical transmission medium using a decision directed least mean in which coefficients of a channel equalizer are adjusted based on the output of the symbol estimation operation.

21. The optical communication system of claim 15, wherein the symbol estimation operation uses a maximum likelihood sequence estimation (MLSE) criterion.

22. A non-transitory computer-readable storage medium on which computer-executable instructions are stored, the instructions, when executed by a processor, cause the processor to implement a data reception method, the instructions comprising:
  instructions for receiving the modulated signal over an optical transmission medium wherein the modulated optical signal comprises information bits modulated using polarization division multiplexing;
  instructions for generating a stream of digital samples by performing analog-to-digital conversion of the received modulated signal;
  instructions for processing the stream of digital samples through a first decoding stage in which carrier frequency and phase recovery is performed to obtain a stream of recovered digital samples;
  instructions for performing, after the first decoding stage, post-equalization on the stream of recovered digital samples, wherein the performing post-equalization includes iteratively performing:
    a channel equalization on the stream of recovered digital samples;
    a digital filtering operation on output of the channel equalization using a digital post filter, wherein a response of the digital post filter is adjusted adaptively, and
    a symbol estimation operation on output of the digital post filter, wherein parameters for the symbol estimation operation are adjusted adaptively based on the response of the digital post filter;
  until an iteration termination criterion is satisfied;
  wherein an output of the symbol estimation operation is fed back into the channel equalization operation; and
  instructions for recovering, after termination of iterations, the information bits from the output of the symbol estimation process.

23. The non-transitory computer-readable storage medium claim 22, further comprising:
  instructions for adaptively adjusting, using the estimates of the information bits, coefficients of the digital post filter.

24. The non-transitory computer-readable storage medium claim 22, further comprising:
  instructions for performing error correction to generate the output of the symbol estimation operation.

25. The non-transitory computer-readable storage medium claim 22, wherein the iteration termination criterion comprises estimating improvement in a bit error ratio over a previous iteration.

26. The non-transitory computer-readable storage medium claim 22, further including:
   instructions for performing symbol alignment on the output of the symbol estimation process.

27. The non-transitory computer-readable storage medium claim 22, wherein the instructions for performing the channel equalization on the stream of samples include instructions for estimating characteristics of the optical transmission medium using a decision directed least mean square in which coefficients of a channel equalizer are adjusted based on the output of the symbol estimation operation.

28. The non-transitory computer-readable storage medium claim 22, wherein the symbol estimation operation uses a maximum likelihood sequence estimation (MLSE) criterion.

\* \* \* \* \*